No. 754,086. PATENTED MAR. 8, 1904.
H. G. NICHOLS.
TRAVERSE QUADRANT.
APPLICATION FILED FEB. 12, 1903.
NO MODEL. 2 SHEETS—SHEET 2.
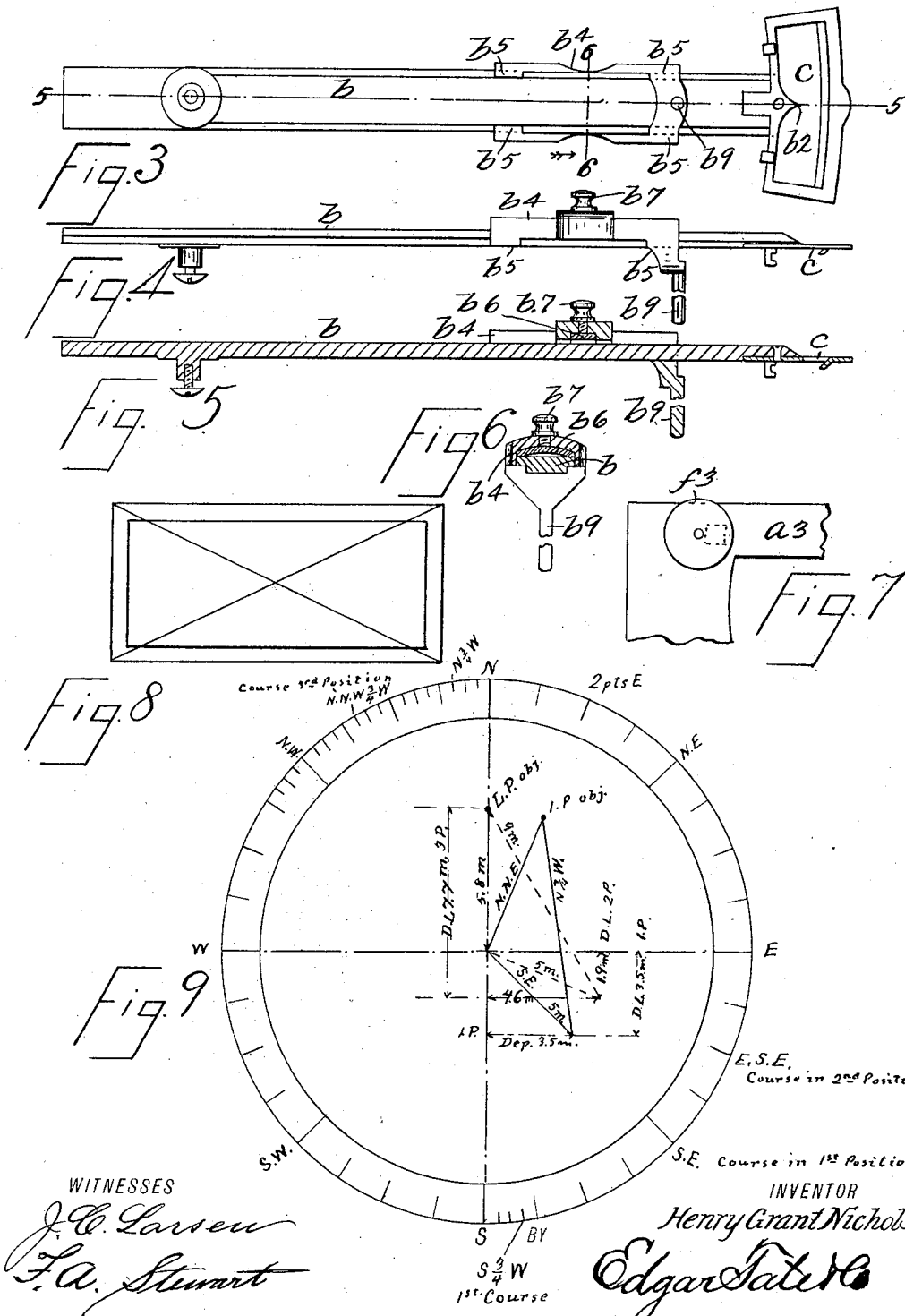

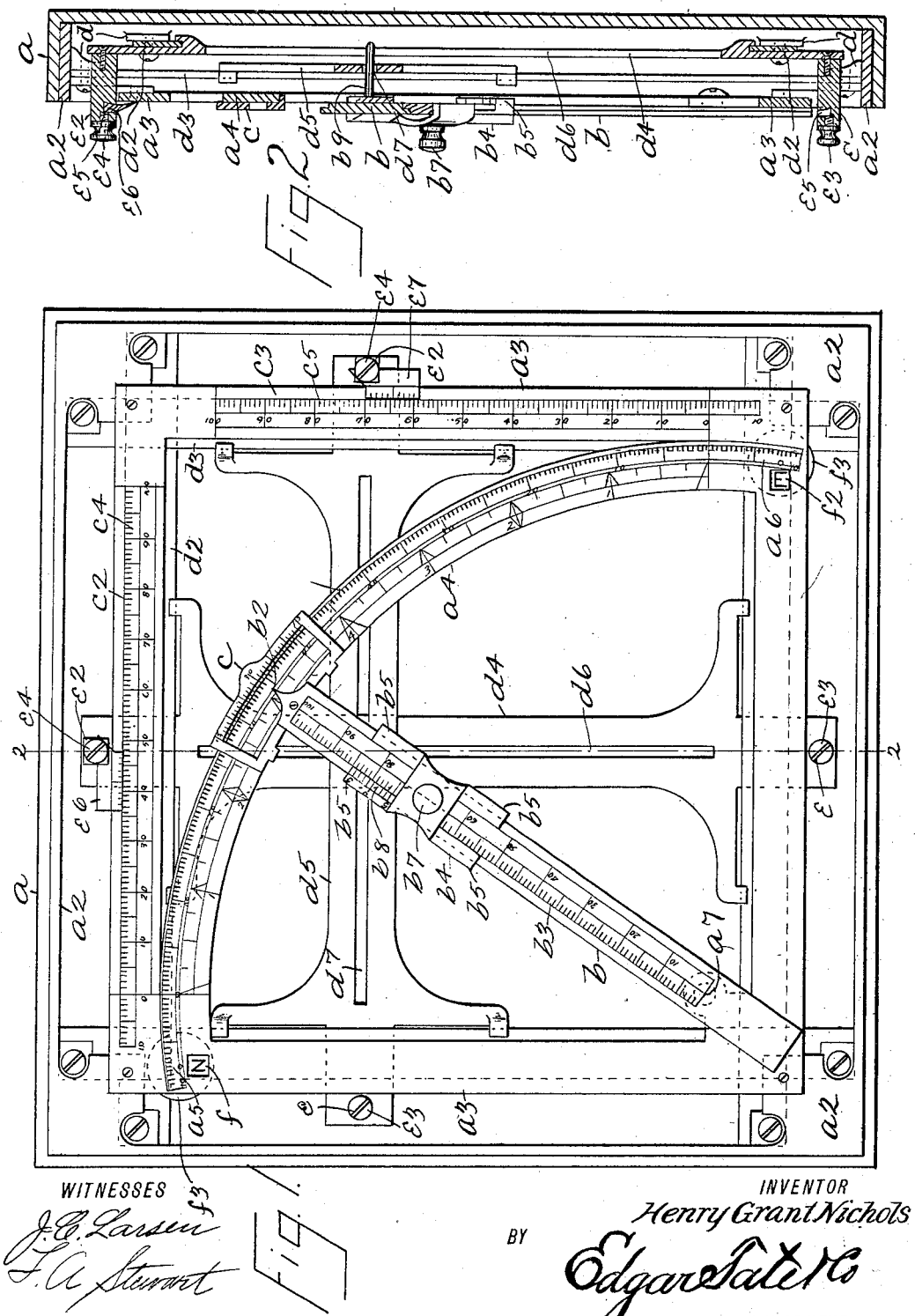

No. 754,086. Patented March 8, 1904.

UNITED STATES PATENT OFFICE.

HENRY GRANT NICHOLS, OF IRVINGTON, NEW YORK.

TRAVERSE QUADRANT.

SPECIFICATION forming part of Letters Patent No. 754,086, dated March 8, 1904.

Application filed February 12, 1903. Serial No. 143,053. (No model.)

*To all whom it may concern:*

Be it known that I, HENRY GRANT NICHOLS, a citizen of the United States, residing at Irvington, in the county of Westchester and State of New York, have invented certain new and useful Improvements in Traverse Quadrants, of which the following is a specification, such as will enable those skilled in the art to which it appertains to make and use the same.

The object of this invention is to provide a traverse quadrant which is primarily designed for the use of mariners and navigators, but may be used by surveyors, architects, mechanics, and others for the purpose of accurately ascertaining distances, angles, &c., at a glance without the necessity of laborious computations, a further object being to provide an instrument of the class hereinafter described and claimed which may be used by navigators in determining distances sailed or to be sailed on a given course either in plane, parallel, middle latitude, or Mercator's sailings, the departure, latitude, longitude, difference in latitude or longitude, &c., having given one or more of the same as a basis upon which to set the instrument.

My invention is fully described in the following specification when taken in connection with the accompanying drawings, in which suitable reference characters are used to indicate the several parts of my invention in each of the views, and in which—

Figure 1 is a plan view of my traverse quadrant; Fig. 2, a section on the line 2 2 of Fig. 1; Fig. 3, a plan view of a radial arm which I employ; Fig. 4, a side view thereof; Fig. 5, a section on the line 5 5 of Fig. 3; Fig. 6, a section on the line 6 6 of Fig. 3; Fig. 7, a bottom plan view of a part of the frame of my instrument, and Figs. 8 and 9 diagrammatic explanations of problems solved by the use of my invention.

In the practice of my invention I provide a box or casing $a$, within which is mounted a frame $a^2$, of brass, steel, aluminium, or other suitable material, and upon which is mounted a supplemental frame $a^3$, which forms a perfect square and which is elevated at some distance above the frame $a^2$. The frame $a^3$ is also provided with a quadrant $a^4$, which is divided into nine divisions of ten degrees each, numbered from each end toward the center in tens from ten to forty and graduated to one-half degrees on its outer edge, and, as plainly shown at $a^5$ and $a^6$ in Fig. 1, the scale is continued on either side of the base-lines zero to the distance of ten degrees, the graduations thereof being reversed in their numbers from those in the arc of ninety degrees. The inner edge of the quadrant $a^4$ is divided into eight equal parts, numbered from one to four from the basic lines of said quadrant to the center thereof, and these divisions correspond to the divisions of a compass and may be so indicated, as shown, and are used for finding the courses in all methods of sailing. Mounted on the frame $a^3$ and pivotally secured at the center $a^7$ of the quadrant $a^4$ is a radial arm $b$, the outer end $b^2$ of which is pointed and adapted to be used as an index in reading the graduations on the quadrant $a^4$, and the radial arm $b$ is provided with a scale $b^3$, the graduations of which are numbered from zero at the pivotal point $a^7$ to one hundred miles or minutes at the inner edge of the quadrant $a^4$, which is exactly one-half inch in width, and the scale $b^3$ is divided into one hundred spaces, and each space equals one unit. Mounted upon the radial arm $b$ is a slide $b^4$, comprising four branch members $b^5$, a clutch-bar $b^6$, and a set-screw $b^7$, and the ends of the members $b^5$ are turned inwardly and engage with the under surface of the radial arm $b$, and the clutch-bar $b^6$ is slightly arched, so as not to bear on the graduations of the scale $b^3$, said clutch-bar being adapted to be operated by the set-screw $b^7$, thereby holding the slide $b^4$ in any desired position on the radial arm $b$.

The sides of the radial arm are preferably provided with longitudinal runs on their under sides, and the inner sides of the branch members $a^5$ are beveled to meet the surface of the arm $b$, and one of the said branch members is provided with a vernier $b^8$ of ten graduations corresponding in length to eleven of the graduations on the scale $b^3$, and by means of the vernier $b^8$ readings to one-tenth of a unit may thus be made, and secured to the under side of the slide $b^4$ and extending downwardly a predetermined distance is a finger $b^9$, the object of which will be hereinafter explained.

Secured to the outer end $b^2$ of the radial arm $b$ is a folding vernier $c$, reading to one minute, and there are thirty graduations thereon corresponding to twenty-nine graduations on the outer edge of the quadrant $a^4$, with which it is adapted to operate, and the thirty graduations on the folding vernier $c$ are divided into six equal divisions and numbered in fives from the center to each end thereof, and this vernier is read in the direction with numbers on the quadrant. By means of this construction it will be seen that the radial arm $b$ and vernier $c$ may be moved to any point on the quadrant $a^4$ and the slide $b^4$ may be moved and set at any point on the radial arm $b$, and approximately exact readings thereon may be made by means of the verniers $b^8$ and $c$.

The side members $c^2$ and $c^3$ of the supplemental frame $b^3$ are also each provided with a scale $c^4$ and $c^5$ of one hundred units extending from zero of the quadrant $a^4$ to a point exactly in line with the inner edge of the quadrant $a^4$ at each end thereof, and the scales are extended one division in contrary direction from zero.

The frame $a^2$ is provided with lugs $d$, which are adapted to hold tracks $d^2$ and $d^3$, arranged on the inner sides of the frame $a^2$, and the tracks $d^3$ are preferably higher than the tracks $d^2$, and mounted upon the tracks $d^2$ is an indicator-slide $d^4$, having long bearing-surfaces, as shown, and similarly placed upon the tracks $d^3$ is another indicator-slide $d^5$, arranged at right angles to the slide $d^4$ and adapted to freely pass thereover, and the indicator-slides $d^4$ and $d^5$ are provided each with a longitudinal slot $d^6$ and $d^7$, respectively, into which closely passes the finger $b^9$, and, as will be seen, when the radial arm $b$ and finger $b^9$ are moved the indicator-slides will be moved thereby; but if the slide $b^4$, which carries the finger $b^9$, be loose on the radial arm $b$ the moving of one of the indicator-slides will not disturb the other indicator-slide, as the slide $b^4$ will move over the radial arm $b$.

On the outer ends of each of the indicator-slides $d^4$ and $d^5$ are posts $e$ and $e^2$, provided with set-screws $e^3$ and $e^4$, respectively, and the posts $e^2$ are provided with slots $e^5$ near the tops thereof, into which are passed and firmly held plates $e^6$ and $e^7$, provided each with a vernier-scale, intended for reading fractional parts of a unit on the scales $c^4$ and $c^5$, respectively, with which they are adapted to operate, and are read in contrary direction to numbers on scale.

Adjacent to the ends of the quadant $a^4$ are holes $f$ and $f^2$, beneath each of which is rotatably mounted a disk $f^3$, upon which are plainly marked the letters "N," "E," "S," and "W," any one of which letters is adapted to show in the opening $f$ or $f^2$—as, for instance, in the position shown in Fig. 1. N shows at the top hole $f$, while E shows at the hole $f^2$. If, however, we turn the instrument so that E is at the top, it is changed to N, and N in the hole $f$ is changed to W, as will be readily understood.

It will be understood that if the slide $b^4$ be secured to the radial arm $b$ and the radial arm be moved along the quadrant $a^4$, the indicator-slides $d^4$ and $d^5$ will also be moved a corresponding distance, as well as the verniers connected therewith, and if the radial arm $b$ be stationary and the slide $b^4$ be moved the indicator-slides $d^4$ and $d^5$ will also be moved, and if it is desired to set one of the indicator-slides at a given point, the other indicator-slide being already set and the slide $b^4$ being free to slide over the radial arm $b$, the last-named indicator-slide will not be disturbed by the moving of the first-named indicator-slide, and this movement of the parts takes place in each of the solutions hereinafter explained—as, for instance, setting one indicator-slide at thirty miles and the other at forty miles, the slide $b^4$ will register fifty miles on the radial arm $b$.

The operation of and uses to which my invention may be put will be fully described in the following description, which embodies a number of examples and solutions therefor:

A navigator may compute all courses and distances in a day's work of the ship, as well as reducing all such courses and distances to a single course and distance, and with this instrument a traverse of a half dozen different courses can be worked and all the data necessary to the navigator for the skilful handling of the ship can be found with as many movements of its parts without recourse to books or tables of any kind.

The tedious work of interpolating for minutes in the course, latitude, and longitude is abolished, as will be readily seen by any person who has been compelled to work out his position by the use of tables of logarithms.

In using the instrument it must be remembered that north and south are the zero-points and east and west are ninety degrees or by compass eight points and must be counted accordingly, and the instrument is supposed to be held in the position of Fig. 1, but may be turned in any direction to correspond to the direction of the ship or for the purpose of making various calculations.

My invention may be used in all the different methods of sailing, and an instance of each will be given, the following case coming under the head of what is known as "plane sailing." Suppose we know the course and distance sailed and we require the difference in latitude and the departure. We take the course, say, northeast on the quadrant $a^4$ by moving the radial arm $b$ to the position of northeast and take the distance in miles or minutes on the radial arm $b$ by moving the slide $b^4$ to, say, eighty miles. We then look on the departure side $c^2$ of the instrument for the departure, which registers approximately fifty-six and one-half degrees or miles, and the difference in latitude will be found on the side $c^3$, and this operation may be varied to find any results under the head of plane sailing.

The following case comes under the head of what is known as "parallel sailing," and suppose we have given the latitude and the difference in longitude and we desire to find the departure and distance, we take the latitude on the quadrant $a^4$ by moving the radial arm $b$ to that position, and we take the difference in longitude on the radial arm $b$ by moving the slide $b^4$ to the required position. The longitude is in minutes on the radial arm $b$. The departure and distance are in miles and will always be found on the latitude side $c^3$ of the instrument and, as can be seen, are both the same in this style of sailing.

To find the number of miles in one degree of longitude on any parallel of latitude, we take the latitude on the quadrant $a^4$ in the manner previously described as a course and the longitude sixty minutes on the radial arm $b$. This gives the number of miles in one degree of longitude on the latitude side $c^3$ of the instrument. It is obvious from the foregoing example that given the number of miles in any one degree of longitude its parallel of latitude can be found on the quadrant $a^4$.

The following case will be used in conjunction with cases in plane sailing in the different cases of middle-latitude sailing. Taking the middle latitude on the quadrant $a^4$ as a course and the difference in longitude on the radial arm $b$ in minutes, this gives us the departure on the latitude side $c^3$ of the instrument, and it will be apparent that any of the problems which occur in middle-latitude sailing may be solved in a similar manner by the use of my instrument.

The following case will be used in conjunction with cases in plane sailing and middle-latitude sailing in the different cases of Mercator's sailing using meridional parts, increased latitude. Take the middle latitude on the quadrant $a^4$ as a course and the difference in latitude on the latitude side $c^3$. This gives the meridional difference on the radial arm $b$ or increased latitude, and various problems in this style of sailing may be solved in a similar manner—as, for instance, take a north latitude of thirty-one degrees and a north latitude of thirty degrees and find the middle latitude. By adding the same together and dividing by two we have the middle latitude of thirty degrees and thirty minutes, which equals the course to be taken on the quadrant $a^4$. Taking a north latitude of thirty-one degrees and a north latitude of thirty degrees and subtract thirty degrees from the thirty-one degrees, we have a result of one degree, which being multiplied by sixty equals sixty miles, which is taken on the latitude side $c^3$ of the instrument, and this gives the meridional difference on the radial arm $b$ and equals sixty-nine and three-tenths miles.

The following case is used in taking the departure or finding the ship's position from some object astronomically known, and Fig. 9 of the drawings will be of use in understanding the case. Given course and distance sailed between two bearing-points to find the distance of object from first and second bearing-points: On leaving port a ship passes an object on a point of land which bears from the ship north-northeast or two points east and sails a course southeast until the object bears north three-fourths west, when according to reading of log we will suppose she has traveled five miles and the second bearing-point is north three-fourths east. Taking the course on the quadrant $a^4$ and the distance is five miles and the second bearing-point is north three-fourths east. Taking the course on the quadrant $a^4$ and the distance five miles on the radial arm $b$, we find the departure to be three and five-tenths miles and also the difference in latitude to be three and five-tenths miles. The object from first bearing-point is two points east. Swing the bearing to north, which changes all the bearings and course two points, then we have for our second position: The first bearing-point is north, the course equals east-southeast, the distance is five miles, and the second bearing-point is north-northeast three-fourths west. Taking the course on the quadrant $a^4$ and the distance on the radial arm $b$ and we find the departure on the side $c^2$ to be four and six-tenths miles and the difference in latitude on the side $c^3$ to be one and nine-tenths miles. The triangle showing the object in first position gives the true bearings, course, and distance sailed between. The dotted triangle shows the bearings hinged and gives the true distances corresponding to the second position. Next we use the hypotenuse of the triangle in the second position, north-northwest three-fourths west, and use it as a course on the quadrant $a^4$, and the departure four and six-tenths miles on the side $c^2$ of the instrument, and in this position we find the distance equals nine miles on the radial arm $b$, and the difference in latitude equals seven and seven-tenths miles on the side $c^3$.

When the instrument is in second position, the difference in latitude equals one and nine-tenths miles subtracted from the difference in latitude, seven and seven-tenths miles, found in the third position, and we have five and eight-tenths miles, which equals the distance of object from first bearing-point. Then we have the distance of object from first bearing-point north-northeast five and eight-tenths miles, distance from the object from second bearing-point north three-fourths west nine miles. Take the reverse of second bearing-point and enter it as the first course. Then we have first course equals south three-fourths east and the distance equals nine miles, and in the first problem in plane sailing we take the course on the quadrant $a^4$ and distance on the radial arm $b$, which gives us the departure equaling one and three-tenths miles from object on the departure side $c^2$ and the difference in latitude equaling eight and nine-tenths miles from the object on the latitude side $c^3$ of the instrument.

Where distance, departure, and difference of latitude are less than ten miles, the scale may be enlarged. Suppose each scale to represent ten miles. Then the verniers read to one-hundredth of a mile.

The following problem occurs in architecture and mechanics, and although but one problem and the solution therefor is given it will be apparent that any number of other problems may be solved by the use of my instrument: Having given the rise and run of a plane roof and desiring to find the pitch and length, we take the rise on the departure side $c^2$ of the instrument and the run on the latitude side $c^3$ of the instrument, and this gives us the pitch on the quadrant $a^4$ and the length of the radial arm $b$. In all problems in hip and valley in both equal and unequal pitches the foregoing solution or others by the use of instrument will be possible. Having given the rise and run of an equal-pitch hip or valley and desiring to find the length of hip or valley, find the rise and run of roof, as in the problem and solution last given. Then take the run on the departure side $c^2$ of the instrument and run on latitude side $c^3$, and this gives the run of hip or valley on the radial arm $b$. Next take the run of hip so found on the departure side $c^3$ and the rise of roof on the departure side $c^2$, and this gives the length of hip on the radial arm $b$. In unequal-pitch hip and valley problems in finding lengths of hip or valley in roofs of this kind, as shown in Fig. 8, measurements given must be from extreme end of rafters at eaves, or, in other words, the width of the building must include the projection of rafters over the side or sides. Having given the rise and run of both roofs, to find the length of hip or valley we take the run of both roofs on opposite sides of instrument, which gives the run of hip or valley on the radial arm $b$, and next we take the run so found and the rise of roof on opposite side of instrument, and this gives us the length of hip or valley on the radial arm $b$.

Although I have fully described a number of solutions by means of my instrument, it will be apparent that many other solutions for various purposes may also be determined thereby, and the exact size shown or number of graduations on the scale is not an absolute necessity and may be increased at will, and various other changes in and modifications of the construction herein shown may be made without departing from the spirit of my invention or sacrificing its advantages.

The solutions by means of my invention have been compared with a number of the examples in a standard work on navigation in the different methods of sailing, using the plane tables and tables of logarithms, and found to correspond therewith, allowance being made for slight inaccuracies in the graduations of my present crude model, and the results obtained are such as to indicate a greater degree of precision than those obtained by use of tables.

Having fully described my invention, what I claim as new, and desire to secure by Letters Patent, is—

1. An instrument of the class described, comprising a rectangular frame, a slide mounted in said frame and operating parallel to one side thereof, a supplemental slide mounted in said frame and operating at right angles to the first-named slide and crossing the same, a quadrant arranged in one corner of said frame, a radial arm operating in connection with said quadrant and in operative connection with said slides and means for securing said radial arm and slides in any position, substantially as shown and described.

2. An instrument of the class described comprising a frame having a quadrant, slides mounted in said frame and at right angles to each other, a radial arm operating in connection with said quadrant, a finger slidably mounted on said radial arm and adapted to engage slots in said slides and means for securing said radial arm and slides in any position substantially as shown and described.

3. An instrument of the class described comprising a frame, two slides mounted in said frame and adapted to slide thereon, one above the other and at right angles to each other, a supplemental frame mounted over said first-mentioned frame, graduated scales on the side members of said supplemental frame, a quadrant secured to said supplemental frame and graduated on its outer edge, verniers mounted on said slides and adapted to be read on the graduated scales on said supplemental frame, a radial arm pivoted on said supplemental frame and operating in connection with said quadrant, a graduated scale on said radial arm, a slide mounted on said radial arm, a vernier on said slide and adapted to be read on the scale on said radial arm, a folding vernier on the outer end of said radial arm and adapted to be read in connection with the graduations on the outer edge of said quadrant, substantially as shown and described.

4. In an instrument of the class described comprising a frame, slides mounted thereon, a supplemental frame, a quadrant mounted thereon, a radial arm in operation with said quadrant and a slide mounted on said radial arm, a plurality of openings in the said supplemental frame, a disk removably mounted beneath each of said openings, said disks each bearing the cardinal points of the compass, any one of which is adapted to be read in one of said openings, substantially as shown and described.

In testimony that I claim the foregoing as my invention I have signed my name, in presence of the subscribing witnesses, this 9th day of February, 1903.

HENRY GRANT NICHOLS

Witnesses:
 JOSEPH G. DENARD,
 SAMUEL J. ENGLISH.